(12) United States Patent
Faye et al.

(10) Patent No.: US 10,442,557 B2
(45) Date of Patent: Oct. 15, 2019

(54) SATELLITE COMPRISING AN OPTICAL PHOTOGRAPHY INSTRUMENT

(71) Applicant: AIRBUS DEFENCE AND SPACE SAS, Les Mureaux (FR)

(72) Inventors: Frédéric Faye, Toulouse (FR); Eric Beaufume, Toulouse (FR); Jacques Cottier, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 0 days.

(21) Appl. No.: 15/764,667

(22) PCT Filed: Sep. 29, 2016

(86) PCT No.: PCT/FR2016/052476
§ 371 (c)(1),
(2) Date: Mar. 29, 2018

(87) PCT Pub. No.: WO2017/055750
PCT Pub. Date: Apr. 6, 2017

(65) Prior Publication Data
US 2018/0290768 A1    Oct. 11, 2018

(30) Foreign Application Priority Data
Oct. 2, 2015  (FR) ...................... 15 59387

(51) Int. Cl.
*G02B 23/00*   (2006.01)
*B64G 1/10*    (2006.01)
(Continued)

(52) U.S. Cl.
CPC ............. *B64G 1/1021* (2013.01); *B64G 1/10* (2013.01); *B64G 1/402* (2013.01); *B64G 1/641* (2013.01);
(Continued)

(58) Field of Classification Search
CPC ........ G02B 7/183; G02B 23/00; G02B 23/02; G02B 23/06; G02B 23/16; B64G 1/00;
(Continued)

(56) References Cited

U.S. PATENT DOCUMENTS 7,513,459 B2    4/2009   Cepollina et al.
7,631,839 B1 *  12/2009  Duncan ................. B64G 1/105
                                               244/158.1
(Continued)

FOREIGN PATENT DOCUMENTS

CN   104648693 A    5/2015
EP     2662287 A1   11/2013
(Continued)

OTHER PUBLICATIONS

International Search Report, dated Dec. 15, 2016, from corresponding PCT application No. PCT/FR2016/052476.
(Continued)

Primary Examiner — Arnel C Lavarias
(74) Attorney, Agent, or Firm — Young & Thompson

(57) ABSTRACT

A satellite includes: at least one optical photography instrument including a main lens having an optical axis and the optical instrument having a field of view; at least one launcher interface system, intended for being removably secured to a satellite interface system of a launcher of the satellite; a linking device between the launcher interface and the optical instrument extending substantially parallel to the optical axis of the main lens between an upper end and a lower end; the launcher interface system is connected to the linking device by the lower end and the optical axis of the optical instrument is directed from the upper end towards the lower end of the linking device, the launcher interface system being outside the field of view of the instrument.

20 Claims, 8 Drawing Sheets

(51) Int. Cl.
*B64G 1/64* (2006.01)
*B64G 1/40* (2006.01)
*G02B 23/02* (2006.01)
*G02B 23/16* (2006.01)

(52) U.S. Cl.
CPC ............. *G02B 23/02* (2013.01); *G02B 23/16* (2013.01); *B64G 1/405* (2013.01); *B64G 2001/1028* (2013.01)

(58) Field of Classification Search
CPC .................... B64G 1/10; B64G 1/1021; B64G 2001/1028; B64G 2001/1035; B64G 2001/1042; B64G 1/105; B64G 2001/1057; B64G 2001/1064; B64G 2001/1092; B64G 1/14; B64G 1/22; B64G 2001/228; B64G 1/64; B64G 1/641; B64G 2001/643
USPC ....... 359/362, 363, 364, 365, 366, 399, 400; 244/159.4, 159.6, 173.1, 173.2, 173.3
See application file for complete search history.

(56) References Cited

U.S. PATENT DOCUMENTS

| | | | |
|---|---|---|---|
| 7,686,255 B2* | 3/2010 | Harris | B64G 1/222 244/159.5 |
| 8,482,610 B2 | 7/2013 | do Carmo Miranda | |
| 8,730,324 B1* | 5/2014 | do Carmo Miranda | B64G 1/1021 348/144 |
| 8,915,472 B2 | 12/2014 | Aston et al. | |
| 8,947,777 B2 | 2/2015 | Newswander et al. | |
| 9,027,889 B2 | 5/2015 | Aston et al. | |
| 9,394,065 B2 | 7/2016 | Aston et al. | |
| 9,446,863 B2 | 9/2016 | Cheynet De Beaupre | |
| 2009/0152402 A1 | 6/2009 | Massonnet | |
| 2012/0217348 A1* | 8/2012 | Aguirre Martinez | B64G 1/1021 244/158.5 |
| 2013/0099059 A1 | 4/2013 | Cheynet De Beaupre | |
| 2014/0027577 A1 | 1/2014 | Darooka | |
| 2014/0239125 A1 | 8/2014 | Aston et al. | |
| 2016/0046397 A1 | 2/2016 | Aston et al. | |
| 2018/0265227 A1* | 9/2018 | Cheynet De Beaupre | B64G 1/10 |
| 2019/0033891 A1* | 1/2019 | Giraud | B64G 1/1021 |

FOREIGN PATENT DOCUMENTS

| | | |
|---|---|---|
| FR | 2667299 A1 | 4/1992 |
| FR | 2959490 A1 | 11/2011 |
| WO | 2005/110848 A1 | 11/2005 |
| WO | 2012/0116366 A2 | 8/2012 |

OTHER PUBLICATIONS

Boeing Network & Space Systems, "Web page: "Boeing Stacks Two Satellites to Launch as a Pair"", [cited May 7, 2018] Available from: [http://boeing.mediaroom.com/2014-11-12-Boeing-Stacks-Two-Satellites-to-Launch-as-a-Pair].
De Lafontaine et al., "Development of the PRO BA Attitude Control and Navigation Software," Proceedings 4th ESA International Conference on Spacecraft Guidance, Navigation and Control Systems, ESTEC, Noordwijk, The Netherlands, Oct. 18-21, 1999, ESA SP-425, Feb. 2000, ret SAO/NASA Astrophysics Data System, Feb. 2000.
ESA, "Web page: "EROS-B" in its version of Apr. 4, 2015 as obtained from the Wayback Machine of the Internet Archive (https:// archive.org/web/)" , [cited Jun. 7, 2018] Available from: [https:// directory .eoportal .org/web/eoportal/sate 11 ite-missions/e/eros-b].
ESA, "Web page: "EROS B" in its version of Apr. 4, 2015 as obtained from the Wayback Machine of the Internet Archive, with header information indicating the date of the snapshot", [cited Jun. 28, 2018] Available from: [https ://web. archive .org/web/ 20150404180600/https://d irectory. eoporta l.org/web/eoportal/ satellite-missions/e/eros-b].
CDF Study Report, Athena, Assessment of an X-Ray Telescope for the ESA Cosmic Vision Program, Nov. 2014.
ESA, "Web page: "Athena Study Schedule"", [cited May 7, 2018] Available from: [https://www.cosmos.esa.int/web/athena/schedule].
Invitation to Tender A0/1-8232/15/NUBW, Title: Athena Phase-A System Study for a Large X-ray Telescope, 2015.
Written declaration by Beatrice Jane Weihert concerning publication of Invitation to Tender A0/1-8232/15/NUBW, Title: Athena Phase-A System Study for a Large X-ray Telescope, 2015.
Written declaration by Mark Roy Ayre concerning publication of Invitation to Tender A0/1-8232/15/NUBW, Title: Athena Phase-A System Study for a Large X-ray Telescope, 2015.
Assessment Study Report, Athena, The extremes of the Universe: from black holes to large-scale structure, Dec. 2011.
Slides of presentation "The Athena Optics" held on Sep. 8, 2015, 1st Athena Scientific Conference.
ESA Science & Technology, "Web page: "ESA Bulletin 100—The XMM Mission"", [cited Sep. 7, 2018] Available from: [http://sci. esa.int/x mm-newton/31324-esa-bulletin-1 0 01).
ESA, "Web page: "Space in Images—Apr. 2003—Artist's impression of XMM-Newton separating from its Ariane-5 stage"", [cited Jun. 26, 2018] Available from: [https://www.esa.Int/spaceinimages/ Images/2003/04/Artist_s_impression_of XMM-Newton_separating_ from_its_Ariane-5_stage.
ESA Science & Technology, "Web page: "Spacecraft on Adapter""[cited Jul. 9, 2018]Available from: [http:l/sci.esa.int/xmm-newton/38461-24-november].
ESA Science & Technology, "Web page: "ESA Science & Technology: Engineering"", [cited Jul. 5, 2018] Available from: [http:l/ sci.esa.int/xmm-newton/31314-eng ineering/?fbodylongid=804].
ESA Science & Technology, "Web page: "ESA Science & Technology: Launch of XMM-Newton"" [cited Jul. 6, 2018] Available from: [http:l/sci.esa.int/xmm-newton/38990-taunch-of-xmm-new ton/].
ESA, "Web page: "Athena Study Schedule"", [cited Jul. 5, 2018] Available from: [https://www.cosmos.esa.int/web/athena/schedule].
ESA Science & Technology, "Web page: "ESA Science & Technology: Athena assessment study report (Yellow Book), ESA SRE(2011)17"", [cited Jul. 5, 2018] Available from: [http://sci.esa. int/athena/49835-athena-assessment-study-report-yellow-book/].
ESA, "Web page: Conference Archive for conference "Exploring the Hot and Energetic Universe"", cited 09.07.20181 Available from: [https://www.cosmos.esa.int/web/conferences-archive/athena-2015].
ESA Bulletin No. 100, Dec. 1999.
ESA, "Web page: "SAO/NASA Astrophysics Data System" from which the presentation Slides of presentation "The Athena Optics" held on Sep. 8, 2015, 1st Athena Scientific Conference can be retrieved", [cited Jul. 6, 2018] Available from: [http://adsabs.harvard. edu/cgi-bin/nph-abs_connect?&ret_stems=2015eheu.conf&sort= RBIBCODE].
Wikipedia, "Web page: "Hubble Space Telescope, From Wikipedia, the free encyclopedia" as obtained from the Wayback Machine of the Internet Archive, with header information indicating the date of the snapshot" , [cited Jul. 10, 2018] Available from[https://web. archive.org/web/20151001215243/https://en.wikipedia.org/wiki/ Hubble_Space_Telescope].
de Lafontaine, Jean et al., "Web page: "SAO/NASA Astrophysics Data System" from which "Development of the PRO BA Attitude Control and Navigation Software," Proceedings 4th ESA International Conference on Spacecraft Guidance, Navigation and Control Systems, ESTEC, Noordwijk, The Netherlands, Oct. 18-21, 1999, ESA SP-425, Feb. 2000 can be retrieved", [cited Jul. 16, 2018] Available from: [http://adsabs.harvard.edu/abs/2000ESASP .425 . . 4270).
Wikipedia, "Web page: "Hubble Space Telescope, From Wikipedia, the free encyclopedia" in its version of Oct. 1, 2015 as obtained

(56) References Cited

OTHER PUBLICATIONS from the Wayback Machine of the Internet Archive (https://archive.org/web/)", [cited Jul. 10, 2018] Available from:[https://web.archive.org/web/20151 00 121524 3/https://en.wikipedia.org/wiki/Hubble_ Space_ Telescope].

* cited by examiner

SATELLITE COMPRISING AN OPTICAL PHOTOGRAPHY INSTRUMENT

BACKGROUND OF THE INVENTION

Field of the Invention

The invention relates to the field of space vehicles, specifically satellites whose mission involves the presence of optical instruments, such as satellites for observation or measurement.

Description of the Related Art

In order to be released in space, the satellite is first mounted and fixed on a launch vehicle. The launch vehicle is then propelled into space, and then the satellite is separated from the launch vehicle for release in its determined orbit.

Before being released, as well as during the release phase, the satellite on the launch vehicle is subjected to many stresses related to impacts and vibrations, and the attachment of the satellite to the launch vehicle as well as the satellite itself must be able to withstand them. However, the transmission of stresses to the satellite must be controlled carefully, particularly if the satellite has a delicate optical instrument that impacts and vibrations can misalign or damage.

An optical instrument for space missions is typically formed of at least one dioptric, catadioptric, or catoptric objective for focusing rays, for example light rays, in order to obtain an image in a focal plane equipped with detection systems.

The line of sight of the optical instrument, meaning the direction in which the optical instrument is facing, can be coincident with the optical axis of the objective of the instrument or may form an angle with the optical axis by means of deflection mirrors. When the optical instrument is an image capturing instrument, meaning it comprises at least one sensor which enables forming an image of a region, for example a region of the earth's surface, the optical instrument also defines a field of view corresponding to the truncated cone extending from the functional surface of the sensor, meaning the sensor surface on which images are formed, to the captured region.

The optical instrument is typically mounted on a support structure, for example a platform which itself is mounted on the launch vehicle, the line of sight of the instrument being either perpendicular to the platform or parallel to the platform. More specifically, the objective is carried by the platform with its optical axis perpendicular to the platform, deflecting mirrors making it possible to tilt the line of sight. The support structure may carry other satellite equipment as well.

The integrity of the instrument and the alignment of its components may be affected by impacts and vibrations during launch and release, potentially resulting in impaired performance of the instrument.

Thus, to ensure both the mechanical strength of the satellite within the launch vehicle and the protection of the optical instrument, it is customary to secure the satellite to the launch vehicle by assembling the support structure to the launch vehicle, via a ring interfacing the satellite to the launch vehicle such that the line of sight either points away from the interface ring or in a perpendicular direction. The optical instrument is distanced from the interface ring by the support structure, reducing the transmission of impacts and vibrations from the interface ring to the optical instrument.

This arrangement is also a result of the satellite production and installation chain. The support structure and optical instrument are generally manufactured separately at two different locations and then assembled. The instrument is thus added to the support structure, and it is then natural to orient the line of sight away from or perpendicularly to the support structure. The internal volume of the structure is also used to accommodate satellite equipment, in particular the electronics and propellant tanks, and thus forms a service platform.

Patent FR 2,959,490 describes an example of such a satellite. In this example, the satellite structure comprises an equipment support platform and load-bearing walls, in this case four, forming a service housing and rigidly fixed to a launch vehicle interface ring, this ring being intended to be fixed to the satellite interface ring of a launch vehicle. According to one embodiment, the satellite includes a payload housing fixed at one end to the supporting walls and at the other end to a platform, said platform supporting an optical instrument, of which the opening is directed either opposite to the interface ring or to one side. Each of the housings can contain various equipment for the operation of the satellite and optical instrument. The optical instrument is thus distanced from the interface ring by the service housing and the payload housing, which reduces the transmission of stresses from the launch vehicle to the optical instrument.

FIG. 1 schematically illustrates such a satellite 100 according to the prior art, in an exploded view. The satellite 100 of the prior art comprises a launch vehicle interface ring 101 intended to be integrally secured to a satellite interface ring of a launch vehicle, a support platform 102 fixed to the launch vehicle interface ring, an optical instrument, occupying a volume 103 represented by a cylinder in phantom, mounted on the support 102, a support structure 104 fixed to the support platform 102, and a structure 105 for supporting the optical instrument and possibly the electronics associated with the instrument. In this design, the optical instrument 103 comprises a line of sight 106 parallel to the axis 107 of the interface ring 101 and oriented facing away from the ring 101, so that the opening 108 of the instrument 103 is directed away from the ring 101. As already presented, the line of sight 106 may alternatively be perpendicular to the axis 107 of the ring 101, so that the opening 108 is to one side. These are the only two possible arrangements for a satellite according to this design.

One disadvantage of this design is that it limits performance in terms of resolution, particularly of the optical instrument.

Indeed, the optical instrument's performance is generally related to its diameter, meaning the diameter of the objective: the larger it is, the better the performance in terms of resolution and radiometric sensitivity. This is particularly the case when the optical instrument is a telescope, and more precisely a Korsch type telescope as is commonly used in the space sector due to its compactness, in which the diameter of the mirror(s) and the focal length are linked. Thus, if the telescope's performance must be increased, its diameter and length must be increased, which implies an increase in the dimensions of the satellite.

However, in the launch vehicle, the width and height of the space available for the satellite are limited by the volume available within the payload fairing. In the case of a dual launch, the dual launch structure, for example a VESPA structure on a VEGA launch vehicle, comprises a lower compartment in which the dimensions of the passenger are particularly tight.

In the design of the prior art, the length of the satellite is already partly occupied by the support structure, so that the length of the instrument and hence the diameter of the instrument are limited by the diameter of the payload fairing or of the dual launch structure.

There is therefore a need for a new satellite design which overcomes the aforementioned disadvantages.

BRIEF SUMMARY OF THE INVENTION

One object of the present invention is therefore to propose a new satellite comprising an optical instrument with improved performance, while ensuring that the instrument is protected.

For this purpose, a first aspect of the invention relates to a satellite comprising:
- at least one image capturing optical instrument comprising a main objective having an optical axis, and the optical instrument having a field of view;
- at least one launch vehicle interface system intended to be removably secured to a satellite interface system of a satellite launch vehicle;
- a linking device between the launch vehicle interface and the optical instrument, extending substantially parallel to the optical axis of the main objective between an upper end and a lower end.

The launch vehicle interface system is then connected to the linking device by the lower end, and the optical axis of the optical instrument is directed from the upper end towards the lower end of the linking device, the launch vehicle interface system being outside the field of view of the instrument.

According to one embodiment, the linking device comprises a side wall of cylindrical shape having its axis parallel to the line of sight, and comprises an inner surface turned towards the line of sight, defining an interior space into which extends at least a portion of the main objective of the optical instrument.

The main objective is for example a telescope comprising at least one main mirror, the optical axis of the main mirror being the optical axis of the objective, and the main mirror extending, preferably completely, within the interior space.

The side wall may be cylindrical with a circular directrix, or cylindrical with a polygonal directrix, or cylindrical with a square or rectangular directrix such that the linking device comprises four walls.

According to one embodiment, the satellite further comprises at least one secondary equipment item fixed to the linking device.

The secondary equipment item comprises for example a propellant tank for propulsion or a tank of gas for electric propulsion.

According to one embodiment, the launch vehicle interface system is an interface ring, the line of sight of the optical instrument passing through the interface ring.

For example, the optical instrument has a diameter greater than 50 cm, and is for example 100 cm.

According to one embodiment, the upper end of the linking device comprises an auxiliary interface system intended to engage with another satellite to form a stack.

BRIEF DESCRIPTION OF THE DRAWINGS

Other features and advantages will become apparent from the description of specific embodiments of the invention, accompanied by figures in which.

DETAILED DESCRIPTION OF THE PREFERRED EMBODIMENTS

Figure 1:
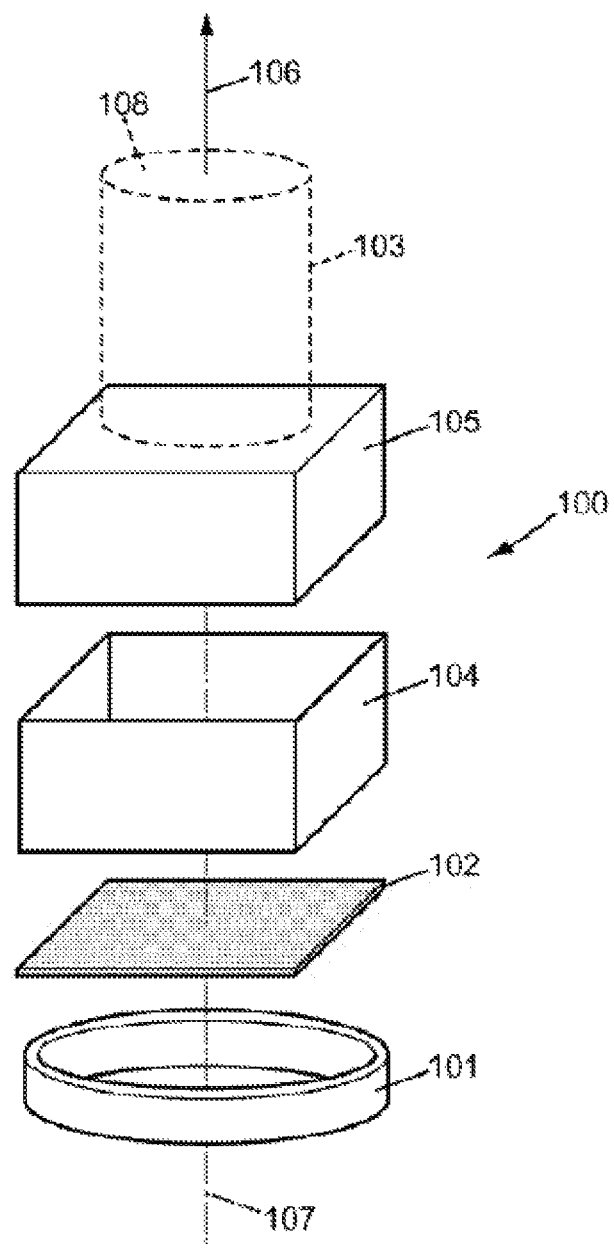
FIG. 1 is a schematic representation of an exploded view of a satellite according to the prior art.

FIG. 1 has already been described in the introduction.

Figure 2:
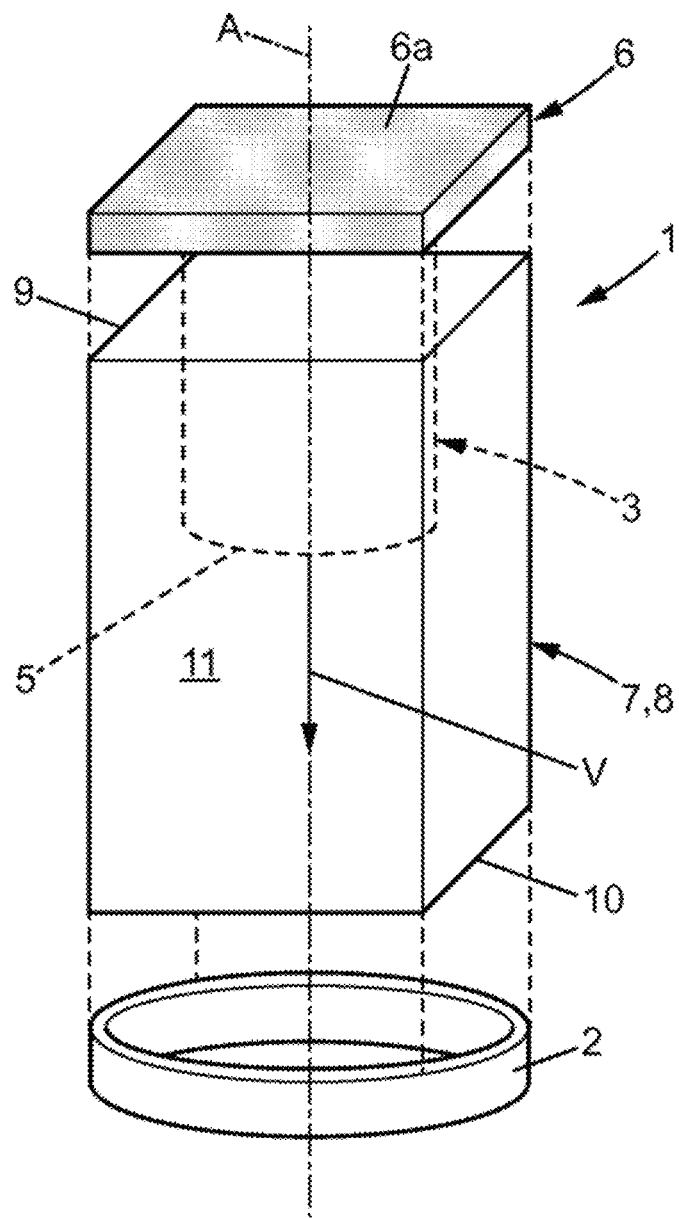
FIG. 2 is a schematic representation of an exploded view of a satellite according to the invention.
Figure 3:
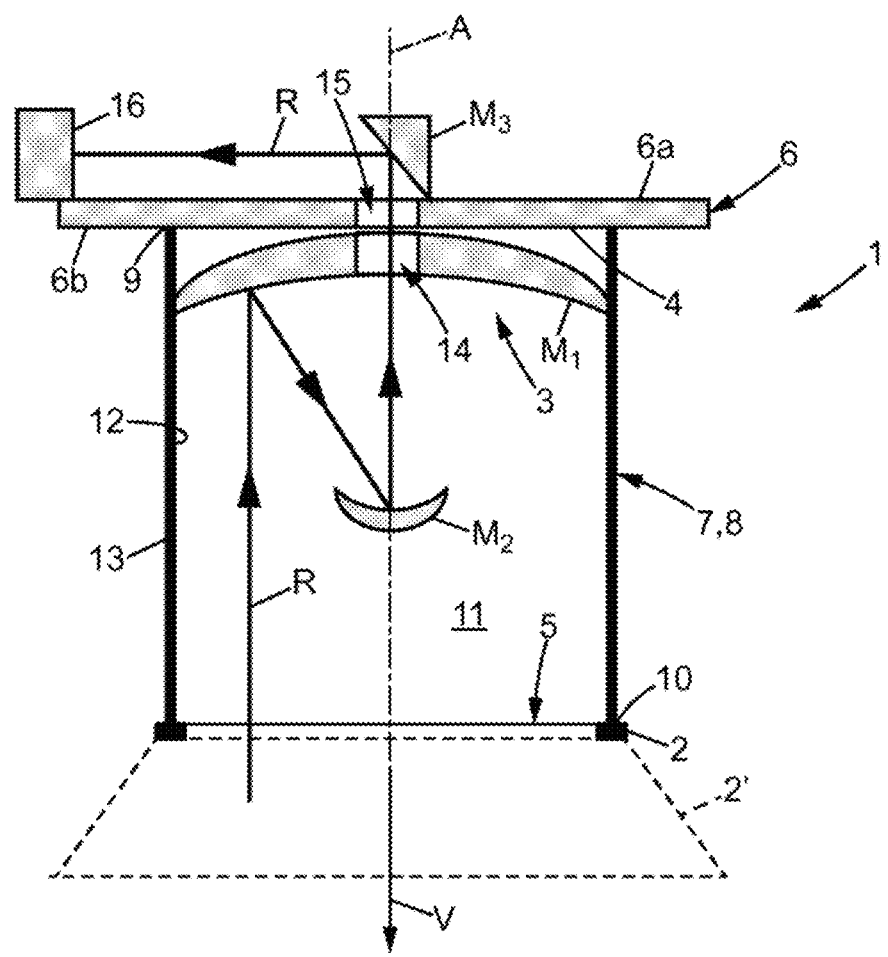
FIG. 3 is a schematic representation of a sectional view of an exemplary satellite according to the invention.

In FIGS. 2 and 3, a first embodiment of a satellite 1 according to the invention is schematically represented, comprising a launch vehicle interface system 2 intended to be removably secured to a satellite interface system 2' of a satellite launch vehicle represented in dashed lines in FIG. 3. The interface system 2 is usually an interface ring of axis A, as will be the case in the following description. The diameter of the interface ring 2 is generally selected from standard spatial dimensions, which are: 937 mm, 1194 mm, and 1666 mm. The satellite interface system 2' is then annular and of complementary dimensions. The two rings 2, 2' are assembled using a locking mechanism, not shown here, which is for example in the form of a clamping belt, also called a band, which is integral to one of the two rings, preferably the launch vehicle interface ring 2 of the satellite 1.

The satellite 1 comprises an optical instrument 3, represented in FIG. 2 as a cylinder drawn with broken lines, indicating the space occupied by the optical instrument 3. The objective of the optical instrument 3 is for example a telescope and comprises a main mirror $M_1$, also called the input mirror, having an optical axis which here corresponds to the line of sight V of the instrument. The optical instrument 3 here is part of the satellite payload, meaning the main equipment for the mission of the satellite 1.

The main mirror $M_1$ of the satellite 1 is fixed to a support platform 6. The support platform is in the form of a plate comprising an upper surface 6a and a lower surface 6b, these two surfaces 6a, 6b being substantially perpendicular to the line of sight V of the instrument 3.

The adjectives "upper" and "lower" and their variants are used herein for clarity in reference to the natural orientation of the figures, and correspond to the position of the satellite in the launch vehicle when the latter is in the launch position.

More precisely, in the example shown in the figures, the rear of the mirror $M_1$ of the instrument 3 is in contact with the lower surface 6b of the support platform 6.

The satellite 1 further comprises a linking device 7 between the optical instrument 3 and the launch vehicle interface ring 2. In the embodiment presented here in a non-limiting manner, the linking device 7 forms the main body 7, meaning a support structure of the satellite 1, to which secondary equipment can be attached in addition to the optical instrument 3, as will be seen further below. Specifically, in the following, the equipment items designated as secondary are all equipment items other than the optical instrument 3, and include for example the satellite control electronics as well as the equipment to ensure proper operation of the optical instrument 3.

In the embodiment presented here, the main body 7 has at least one side wall 8 extending substantially parallel to the line of sight V of the optical instrument, between an upper first end 9 and a lower second end 10.

Alternatively, the linking device 7 may be one or more bars or rods connecting the launch vehicle interface ring 2 to the optical instrument 3. The satellite 1 may then comprise an additional structure to which the secondary equipment can be attached.

For simplification, in the following embodiment, the linking device 7 will be called the main body of the satellite 1.

The upper end 9 of the side wall 8 is fixed to the support platform 6, more precisely to the lower surface 6b of the support platform 6. For example, the entire surface of the upper end 9 is in contact with the lower surface 6b of the platform 6. Linear connecting means, meaning means that extend continuously over the entire surface of the upper end 9, or more or less localized connecting means fix the main body 7 to the platform 6.

The launch vehicle interface ring 2 of the satellite 1 is connected to the main body 7 by the lower end 10, meaning the interface ring 2 is arranged, relative to the main body 7 along the line of sight V, at the lower end 10, and the connection between the interface ring 2 and the main body 7 is established at the lower end 10.

Thus, for example, the lower end 10 of the side wall 8 bears directly on the interface ring 2, and the side wall 8 is fixed to the interface ring 2. In other words, at least a portion of the surface of the lower end 10 of the side wall 8 is in contact with at least a portion of the upper surface of the interface ring 2.

According to another example, the lower end 10 of the main body 7 does not bear directly on the interface ring 2: a vibration damping system is placed between the upper face of the interface ring 2 and the lower end 10.

Thus, by establishing the connection between the main body 7 and the interface ring 2 at the lower end 10, the line of sight V of the optical instrument is substantially parallel to the axis A of the interface ring 2. In addition, as the back of the main mirror M1 is in contact with the platform 6, which is fixed to the upper end 9 of the main body 7, the line of sight V is oriented towards the interface ring 2.

In general, according to the invention, the optical axis of the objective, which here is coincident with the line of sight V of the optical instrument 3, is directed from the upper end 9 towards the lower end 10, and the attachment of the objective is distanced from the interface ring 2 in order to protect it from impacts and vibrations, which are at least partially absorbed by the main body 7. When the objective is a telescope with an input mirror $M_1$, this mirror is thus distanced from the interface ring 2, protecting the input mirror $M_1$.

Furthermore, according to the invention, the interface device 2 is outside the field of view of the optical instrument 3. In other words, the interface device 2 does not block some of the rays from the field of view of the optical instrument 3, for optimum resolution of the image acquisition. In the example, the ring-shaped interface device 2 defines a closed contour with free space in the middle, which the field of view of the instrument 3 passes through.

In the following, the adjective "longitudinal" and variants thereof refer to the direction parallel to the axis A of the interface ring 2 and to the line of sight V; the adjective "transverse" and variants thereof refer to directions perpendicular to the longitudinal direction.

According to an exemplary embodiment, the side wall 8 is of cylindrical shape, of circular or polygonal cross-section, about the line of sight V. For example, in order to form substantially planar surfaces as will be seen below, the cross-section of the side wall 8 may advantageously be square. The side wall 8 thus separates an interior space 11 of the body 7 from the outside environment. Specifically, the side wall 8 has an inner surface 12 turned towards the line of sight V, and an outer 13 surface turned away from the line of sight V. The interior space 11 is then defined by the inner surface 12 and the two ends 9, 10 of the side wall 8, the upper end 9 being closed by the platform 6, the upper end 10 being open to allow rays R to enter the optical instrument 3 and reach the main mirror $M_1$ which lies within the interior space 11. The lower end 10 of the side wall 8 thus bears directly or indirectly against the interface ring 2 such that the line of sight V of the optical instrument 3 traverses the interface ring 2.

Only the main body 7 of the satellite is therefore in contact with the interface ring 2, such that the stresses transmitted to the satellite 1 by the launch vehicle must pass through the main body 7, which absorbs at least a portion of these stresses and helps protect the optical instrument 3.

Secondary equipment, meaning equipment other than the optical instrument 3, may be mounted on the main body 7 and platform 6. In particular, the secondary equipment may be mounted on the outer surface 13 of the side wall 8, meaning they are directly supported by the outer surface 13. The cylindrical side wall 8 may be but is not necessarily centered on the line of sight V, such that the optical instrument 3 is centered within the interior space 11. The optical instrument 3 may also be off-center within the interior space 11 in order to leave an unencumbered area for attachment of secondary equipment directly supported on the inner surface 12, particularly electronic equipment related to the operation of the optical instrument 3.

The objective of the optical instrument 3 is for example a Korsch type telescope comprising the main mirror $M_1$ and a secondary mirror $M_2$. The main mirror $M_1$ has a hole 14 at its center. The two mirrors $M_1$ and $M_2$ are arranged facing one another, so that a ray R entering the instrument 3 along the line of sight V is first reflected by the main mirror $M_1$ onto the secondary mirror $M_2$ so as to again be reflected by the secondary mirror $M_2$ towards mirror $M_1$ where it passes through the hole 14. The hole 14 of the main mirror $M_1$ is coincident with a hole 15 of the support platform 6 which allows the ray R to pass through the platform 6 to a detection system of the optical instrument 3, mounted for example outside the main body 7. The detection system comprises an exterior mirror $M_3$ and at least one sensor 16, these being mounted on the outer surface 6a of the platform 6. The exterior mirror $M_3$ is placed facing the hole 15 of the platform 6, in a manner that reflects the ray R toward the functional surface of the sensor 16 mounted on the upper surface 6a of the support platform 6.

The platform 6 extends transversely beyond the transverse wall 8, meaning that it has a transverse dimension greater than the transverse dimension of the side wall 8, which allows increasing the focal length of the instrument 3 without increasing its length. The sensor 16 is placed on a peripheral edge of the upper surface 6a of the platform, so that the greater the transverse dimension of the platform 6, the greater the distance between the sensor 16 and the exterior mirror $M_3$ can be. Advantageously, the surface of the sensor 16 opposite its functional surface, meaning facing towards space when the satellite is in orbit, may be covered with a radiative material to dissipate heat generated within the satellite. Thus, the distance of the sensor 16 relative to the exterior mirror $M_3$, and thus relative to the optical instrument 3, also allows better heat dissipation.

The two mirrors $M_1$ and $M_1$ of the optical instrument 3 are placed within the interior space 11 of the main body 7, so that the side wall 8 forms protection for the optical instrument 3.

The side wall 8 of the main body 7 then advantageously forms a protective device for the optical instrument 3. For example, as already mentioned, the side wall 8 can serve as a barrier to rays which are not parallel to the line of sight V.

The arrangement of mirrors $M_1$ and $M_2$ of the instrument 3 allows distancing mirror $M_1$ from the interface ring 2, and thus protecting it from the stresses transmitted from the launch vehicle via the launch vehicle interface ring 2.

Many variations of the satellite 1 are possible, for example in the shape of the main body 7, in the type of optical instrument 3, and in the dimensions and additional features that the main body 7 may provide.

Figure 4:
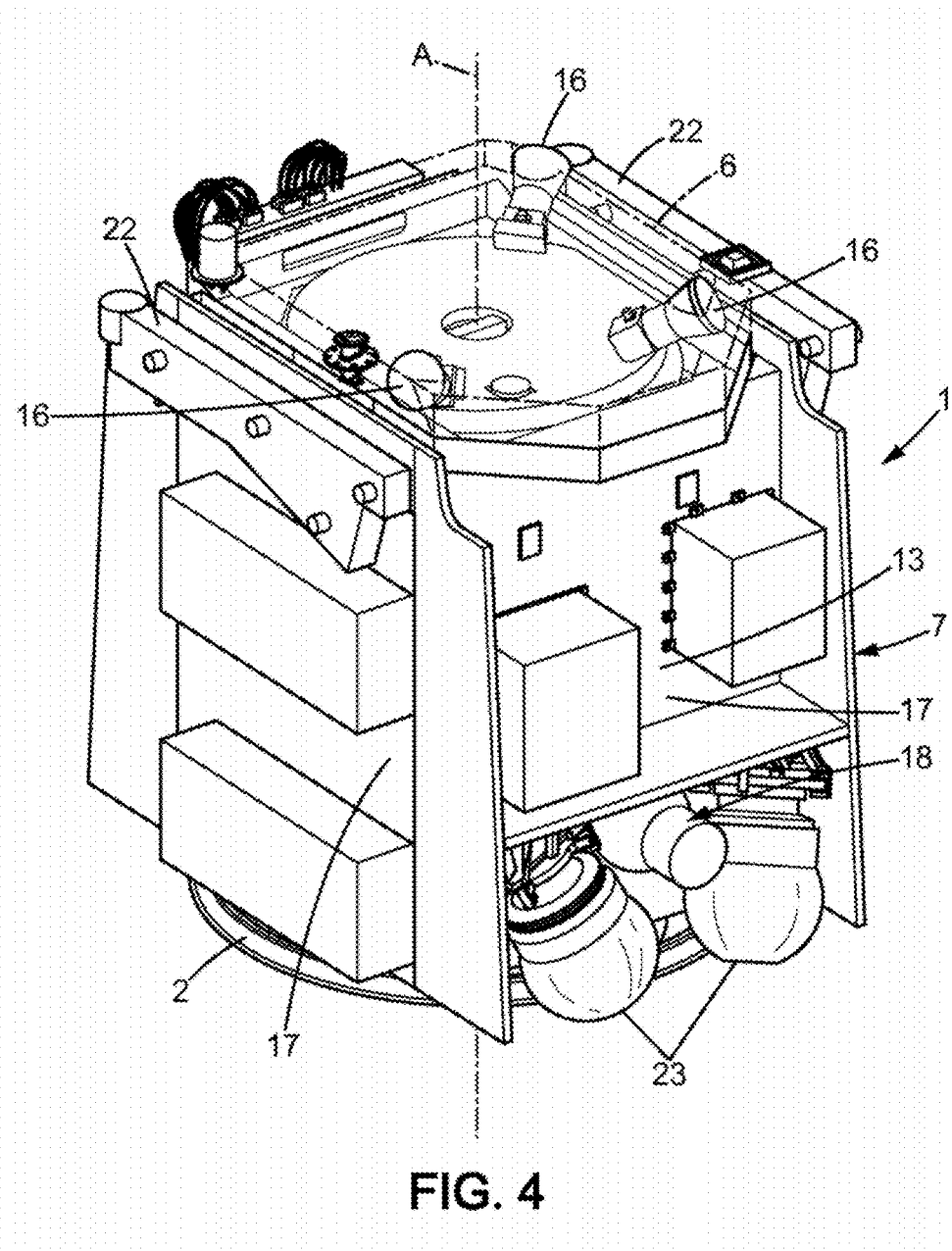
FIG. 4 is a three-dimensional view of an exemplary embodiment of a satellite.
Figure 5:
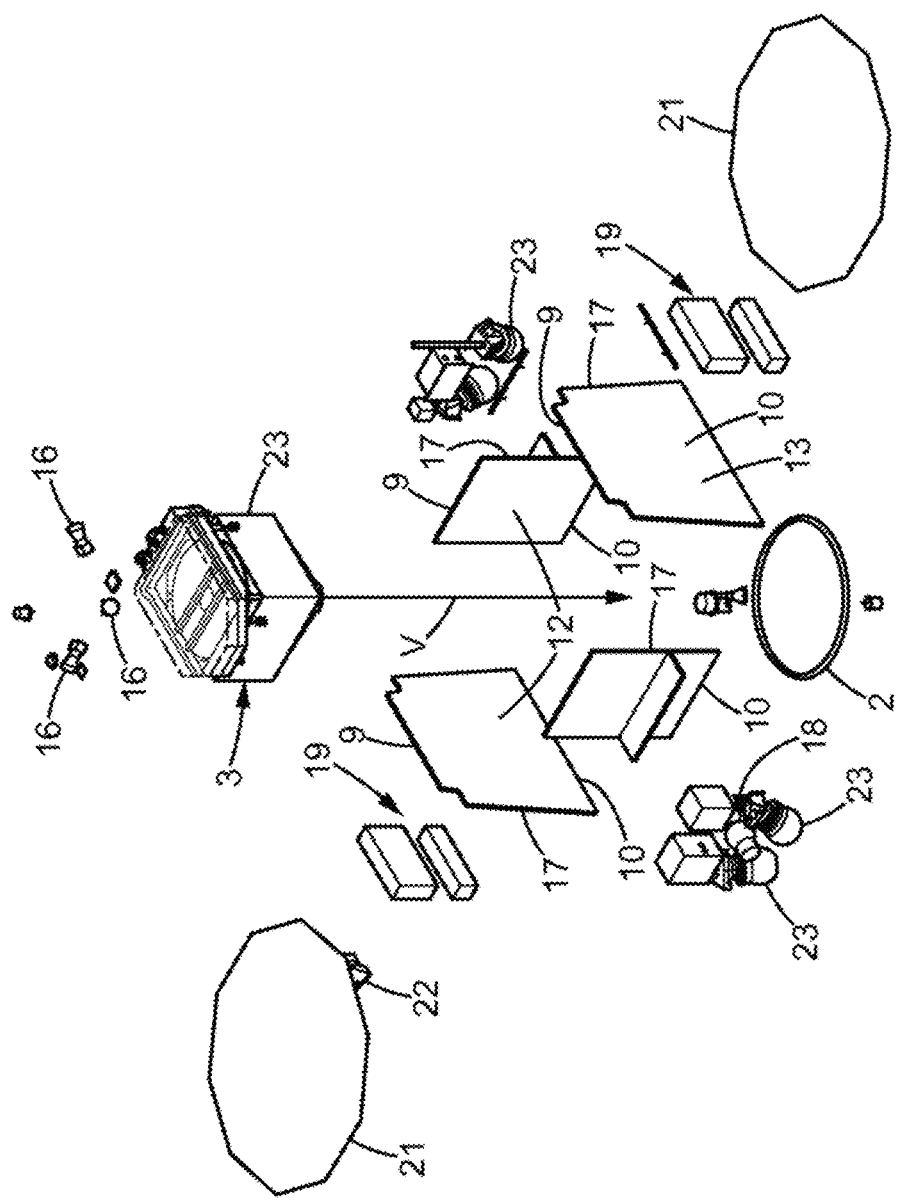
FIG. 5 is an exploded view of the satellite of FIG. 4.
Figure 6:
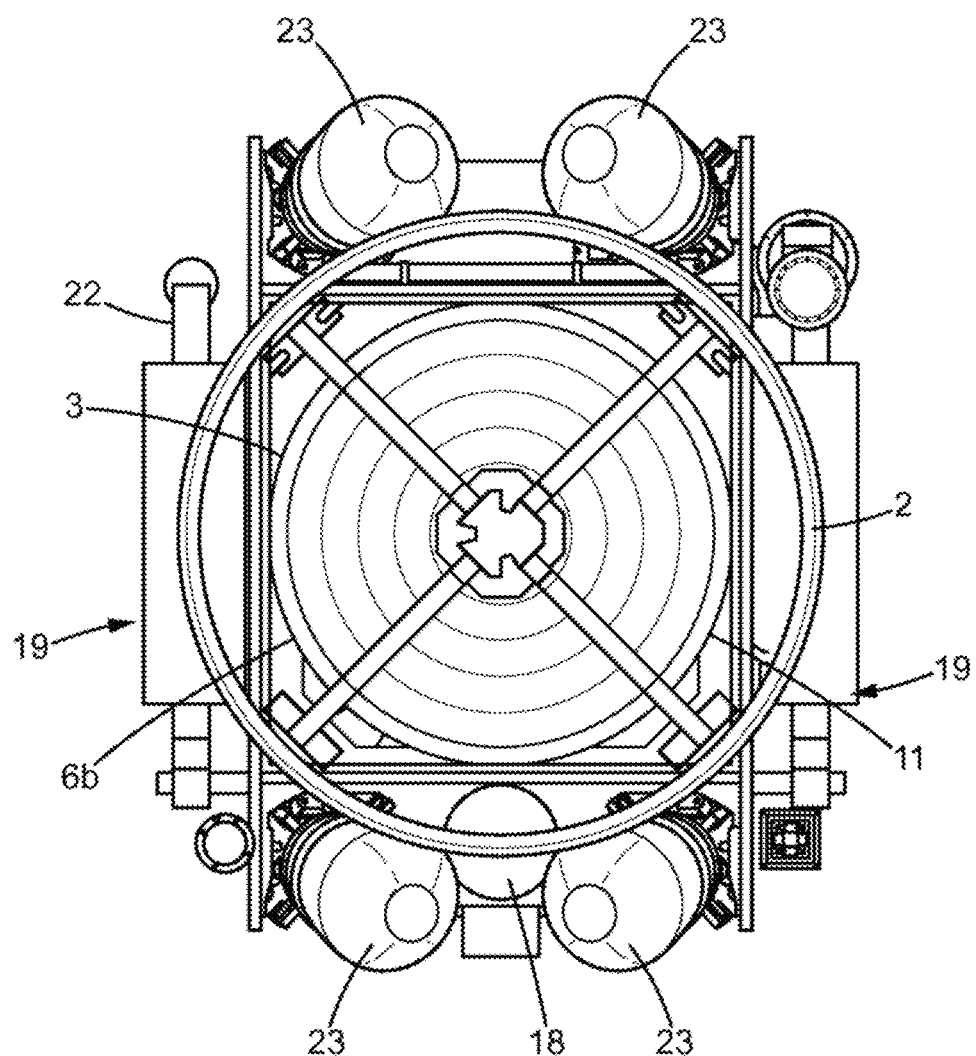
FIG. 6 is a bottom view of the satellite of FIGS. 4 and 5.

Referring to FIGS. 4 to 6, we will now describe an embodiment of the satellite 1 according to the invention wherein the optical instrument 3 is a Korsch type telescope 3 as presented above. The same references will be used to designate elements or components identical or similar to those presented with reference to FIGS. 2 and 3.

In FIG. 4, the platform 6 is illustrated in phantom in order to reveal the main mirror $M_1$ and the sensors 16, the exterior mirror of the detection system being omitted.

In this embodiment, the side wall 8 of the main body 7 is of rectangular or square cross-section, consisting of four substantially planar walls 17 arranged substantially at 90°. Each of the four walls 17 then forms a substantially planar inner face on the inner surface 12 and a substantially planar outer face on the outer surface 13 of the side wall 8, enabling the attachment thereto of secondary equipment, meaning equipment other than the optical instrument 3, contributing to the proper operation of the satellite and to the success of the mission.

The square or rectangular cross-section of the side wall 8 allows optimizing the size to the transverse dimensions of the launch vehicle, taking into account the secondary equipment mounted on the exterior wall 13. However, other polygonal shapes can be used, including hexagonal or octagonal.

Each wall 17 is fixed to the interface ring 2 by the lower end 10. Specifically, two separate surface portions of the lower end 10 of each wall 17 are in direct contact with an upper surface of the interface ring 2, virtually forming two contact points or contact areas. The connection between each wall 17 and the interface ring 2 is then provided for example by a more or less localized connection, such as screws, at each contact point or area. Alternatively, each wall 17 may have only a single point or a single contact area with the interface ring 2.

When the cross-section of the side wall 8 is circular, the diameter preferably corresponds to that of the interface ring 2. Linear connecting means, such as gluing, stapling, or welding, can then be placed continuously over the entire surface of the lower end 10 and the upper surface of the interface ring 2, improving mechanical strength.

Preferably, no other part of the satellite 1 is in contact with the interface ring 2, so that all stresses are transmitted from the launch vehicle to the main body 7.

Due to the substantially planar faces formed by the walls 17, it is easy to mount secondary equipment. In particular, in the embodiment shown here, in order to have the highest possible resolution, the telescope occupies most or even all of the interior space 11 of the main body 7, in other words the main mirror $M_1$ has a maximum diameter. The secondary equipment items are then preferably fixed to the outer surface 13 of the walls 17, meaning they are directly supported by the outer surface 13 of the walls 17. Flat walls 17 are particularly suitable for mounting electronic equipment, but this is not limiting.

A propulsion system 18 is thus mounted on the outer surface 13 of the main body 7. The use of electric propulsion is advantageous because the volume of propellant to be carried is significantly lower than with conventional chemical propulsion. The fuel tank, usually xenon, can thus easily be placed externally on the outer surface 13 of the walls 17, while maintaining acceptable dimensions within the launch vehicle in the transverse directions, which allows leaving the interior space 11 available for the optical instrument 3, and the entire diameter of the main mirror $M_1$ can lie within the interior space 11. In a short-term mission, however, conventional chemical propulsion can be used: the volume of propellant required is low and the tanks can be accommodated on the outer surface of the main body 13.

Other secondary equipment 19 can also be attached to the outer surface 13 of the walls 17, such as batteries, control units, or sensors.

The satellite 1 may further comprise retractable solar panels 21, fixed to the outer surface 13 of the main body 7 by means of pivoting arms 22.

Actuator means, such as CMGs 23 (acronym for Control Momentum Gyroscope) may also be mounted on the outer surface 13 of the walls 17.

Thus, the support platform 6 and the main body 7 together support all the equipment of the satellite 1. A high degree of modularity is the result, as the secondary units can be arranged on the outer surface 13 of the walls 17 independently of the optical instrument 3. The path of the stresses transmitted by the interface ring 2 must follow the side wall 8 of the main body 7, protecting the optical instrument 3. The length of the optical instrument 3, meaning its dimension along its line of sight V, can then be increased while having a lower total length of the satellite 1 compared to the prior art. When the optical instrument 3 is a telescope as previously described, increasing the length of the optical instrument allows increasing the distance between the main mirror $M_1$ and the secondary mirror $M_2$, and therefore increasing the diameter of mirrors $M_1$ and $M_2$ while respecting the dimensional requirements of optical principles. By increasing the diameter of mirrors $M_1$ and $M_2$ until the main mirror $M_1$ fills the interior space 11, the resolution of the telescope is increased.

For comparison, while the diameter of a main mirror of an optical instrument of a satellite according to the prior art can reach a diameter of about 40 to 50 cm (centimeters) within the volume of a VESPA payload fairing for VEGA, the main mirror $M_1$ of the satellite according to the present invention can go beyond this to up to twice this value, meaning it can reach a diameter of up to 1 m, in a configuration where the launch vehicle interface is 1194 mm, and still within the same volume of a Vespa payload fairing for VEGA.

In other words, due to to the design of the satellite 1 in which the stresses pass through the side wall 8 of the main body 7, and by orienting the optical instrument 3 such that its line of sight V is directed towards the lower end 10 connected to the interface ring 2, the total length of the optical instrument 3, and therefore of the satellite, can be reduced to maintain at least equivalent performance to that of the prior art. As presented in the introduction, the length of the satellite 1 is the most critical dimension in terms of footprint within the launch vehicle.

Figure 7:
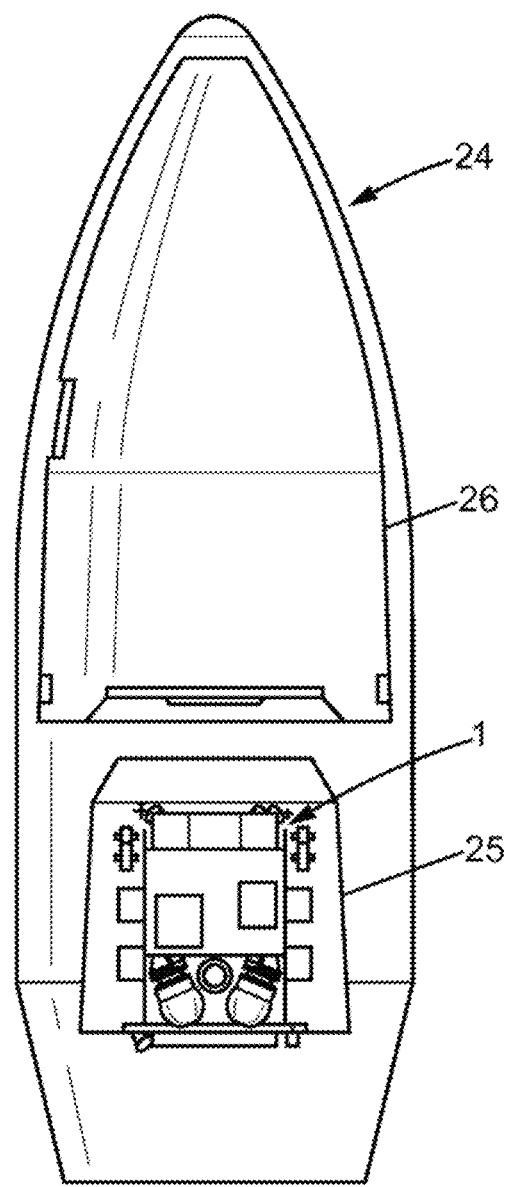
FIG. 7 is a schematic representation of a sectional view of a stack of two satellites according to the invention.
Figure 8:
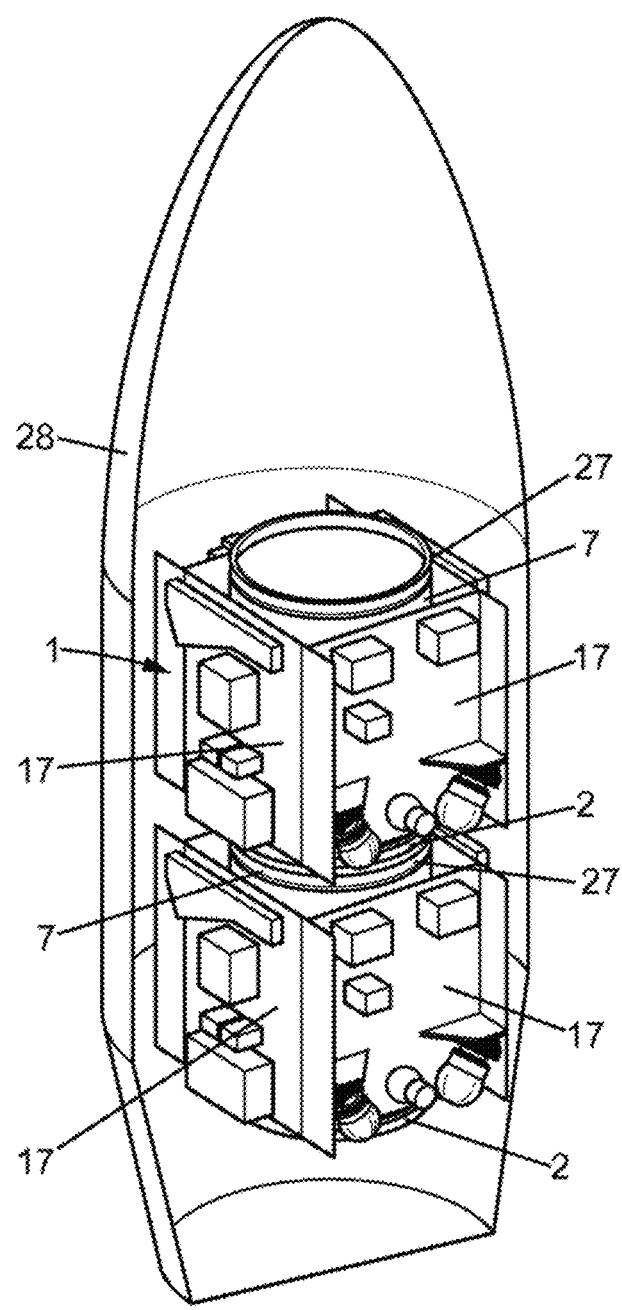
FIG. 8 is a schematic representation of a payload fairing of a VEGA launch vehicle for a dual launch, comprising two compartments of which the lower compartment is a VESPA compartment in which the satellite of FIGS. 4 to 6 is placed.

The satellite 1 according to the invention is particularly suitable for placement in the smaller compartment in the case of a dual launch system, generally the lower compartment such as in a VESPA structure for a VEGA launch vehicle. FIG. 7 thus schematically illustrates the volume of the payload fairing 24 of a VEGA launch vehicle comprising a VESPA structure. Two independent compartments are formed: a lower compartment 25 and upper compartment 26, the adjectives "lower" and "upper" being used herein with reference to the natural orientation of FIG. 7, which corresponds to the orientation of a launch vehicle sitting on the ground for satellite assembly. Each compartment 25, 26 is intended to receive a satellite attached to a satellite interface ring.

The lower compartment 25 is small in size, particularly in the lengthwise direction of the satellite when placed inside. The satellite 1 according to the invention, which is smaller in length while maintaining the desired performance, is therefore particularly suitable for placement within the lower compartment 25.

The satellite 1 may be particularly suitable for stacking with another satellite of the same design or of a different design. To this end, according to another embodiment, the linking device 7 is in the form of a central cylinder having a longitudinal main axis, for example coincident with the axis A of the interface ring 2. The satellite 1 can still comprise walls 17, which are fixed to the central cylinder 7. The support platform 6 is fixed to the central cylinder 7. For example, the optical instrument 3 and the support platform 6 are housed inside the central cylinder 7. The detection system can be mounted outside the central cylinder 7, on the surface of the upper end 9. The central cylinder 7 can extend longitudinally beyond the walls 17 at each end, such that the launch vehicle interface ring 2 can be fixed to the central cylinder 7 at the lower end 10, and the upper end of the central cylinder 7 is available for mounting an auxiliary interface system 27 intended to engage with a complementary interface of another satellite system. As for the launch vehicle interface ring 2, the auxiliary interface system 27 may be an interface ring, and will be so designated in the following. The auxiliary interface ring 2 has an inner surface fixed to the central cylinder 7.

To facilitate stacking two satellites 1 of a design according to the invention, the auxiliary interface ring 2 of a first satellite 1 is intended to engage with the launch vehicle interface ring 2 of the second satellite 1.

The two satellites 1 of the invention can then be stacked as follows.

A first satellite 1 is fixed to a satellite interface ring of a launch vehicle 28 by its launch vehicle interface ring 2. The second satellite 1 is placed on the first satellite 1 so that their lines of sight V are coincident, or at least parallel. The upper end 9 of the first satellite 1 is facing the lower end 10 of the second satellite 1, and the auxiliary interface ring 27 of the first satellite is associated with the launch vehicle interface ring 2 of the second satellite 1. The two rings 2, 27 ensure the connection between the two satellites 1.

It is possible for the detection system mounted on the surface of the upper end 9 of the central cylinder 7 to extend longitudinally beyond the walls 17. In this case, the second satellite 1 of the stack comprises space to accommodate the detection system of the first satellite 1 when the two satellites 1 are stacked.

In such a stack, all of the stresses transmitted by the satellite interface ring 2' of the launch vehicle to the first satellite 1 travel along the side wall 8 of the main body 7 of the first satellite 1 and are transmitted to the side wall 8 of the main body 7 of the second satellite 1, here again protecting the optical instrument 3 of the second satellite 1. Thus, the mechanical path followed by the stresses is limited to the side wall 8 of the main body 7 of the two satellites 1.

The same is true when more than two satellites 1 according to the invention are so stacked.

The satellite 1 of the design according to the invention therefore allows providing a compact structure while ensuring that the performance of the optical instrument 3, particularly in terms of resolution, is at least equivalent to the state of the art.

In addition to reducing its size while providing equal performance compared to the prior art, the compactness of the satellite 1 allows reducing its inertia and thus facilitating satellite attitude control in order to reduce energy consumption.

In addition, as the satellite length is decreased, the surface area exposed to the velocity vector is decreased, thereby decreasing drag, and thus further facilitating attitude control in order to reduce energy consumption.

When the satellite 1 is mounted in the launch vehicle, with the launch vehicle interface ring 2 integral with the satellite interface ring 2', the line of sight V is oriented downwards relative to the direction of gravity. As the environment in the launch vehicle is not free of particles such as dust, by orienting the optical instrument 3 to have its line of sight aimed downward, the mirror $M_1$ is protected from particulate contamination which would degrade the performance of the optical instrument 3.

The invention claimed is:

1. A satellite comprising:
   at least one image capturing optical instrument comprising a main objective having an optical axis, the optical instrument having a field of view;
   at least one launch vehicle interface system configured to be removably secured to a satellite interface system of a satellite launch vehicle; and
   a linking device between the launch vehicle interface and the optical instrument, extending substantially parallel to the optical axis of the main objective between an upper end and a lower end;
   wherein the launch vehicle interface system is connected to the linking device by the lower end, and
   wherein the optical axis of the optical instrument is directed from the upper end towards the lower end of the linking device, the launch vehicle interface system being outside the field of view of the instrument.

2. The satellite according to claim 1, wherein the linking device comprises
   a side wall of cylindrical shape having its axis parallel to the optical axis, and
   an inner surface turned towards the optical axis, defining an interior space into which at least a portion of the main objective of the optical instrument extends.

3. The satellite according to claim 2, wherein the main objective is a telescope comprising at least one main mirror, an optical axis of the main mirror being the optical axis of the objective, the main mirror extending within the interior space.

4. The satellite according to claim 2, wherein the side wall is cylindrical with a circular directrix.

5. The satellite according to claim 2, wherein the side wall is cylindrical with a polygonal directrix.

6. The satellite according to claim 5, wherein the side wall is cylindrical with a square or rectangular directrix, such that the linking device comprises four walls.

7. The satellite according to claim 1, further comprising at least one secondary equipment item fixed to the linking device.

8. The satellite according to claim 7, wherein the secondary equipment item comprises a propellant tank for propulsion.

9. The satellite according to claim 7, wherein the secondary equipment comprises a tank of gas for electric propulsion.

10. The satellite according to claim 1, wherein the launch vehicle interface system is an interface ring, the optical axis of the optical instrument passing through the interface ring.

11. The satellite according to claim 1, wherein the optical instrument has a diameter greater than 50 cm.

12. The satellite according to claim 11, wherein the diameter of the optical instrument is 100 cm.

13. The satellite according to claim 1, wherein the upper end of the linking device comprises an auxiliary interface system configured to engage with another satellite to form a stack.

14. The satellite according to claim 3, wherein the side wall is cylindrical with a circular directrix.

15. The satellite according to claim 3, wherein the side wall is cylindrical with a polygonal directrix.

16. The satellite according to claim 2, further comprising at least one secondary equipment item fixed to the linking device.

17. The satellite according to claim 3, further comprising at least one secondary equipment item fixed to the linking device.

18. The satellite according to claim 4, further comprising at least one secondary equipment item fixed to the linking device.

19. The satellite according to claim 5, further comprising at least one secondary equipment item fixed to the linking device.

20. The satellite according to claim 6, further comprising at least one secondary equipment item fixed to the linking device.

* * * * *